US012123254B1

(12) United States Patent
Guerra Asunsolo

(10) Patent No.: US 12,123,254 B1
(45) Date of Patent: Oct. 22, 2024

(54) ADJUSTABLE WINDOW BARS WITH EASY RELEASE

(71) Applicant: Ricardo Guerra Asunsolo, Mexico City (MX)

(72) Inventor: Ricardo Guerra Asunsolo, Mexico City (MX)

(*) Notice: Subject to any disclaimer, the term of this patent is extended or adjusted under 35 U.S.C. 154(b) by 0 days.

(21) Appl. No.: 18/226,983

(22) Filed: Jul. 27, 2023

(51) Int. Cl.
*E06B 9/04* (2006.01)
*E05C 9/00* (2006.01)
*E06B 9/01* (2006.01)
*E06B 9/02* (2006.01)

(52) U.S. Cl.
CPC .................. *E06B 9/04* (2013.01); *E05C 9/00* (2013.01); *E06B 9/01* (2013.01); *E06B 9/02* (2013.01)

(58) Field of Classification Search
CPC ..... E05C 9/00; E06B 9/04; E06B 9/01; E06B 9/02; E06B 9/0623; E06B 2009/005; E06B 2009/002
See application file for complete search history.

(56) References Cited

U.S. PATENT DOCUMENTS

| | | | | | | |
|---|---|---|---|---|---|---|
| RE17,978 | E | * | 2/1931 | McWane | E06B 9/01 | 49/56 |
| 1,996,931 | A | * | 4/1935 | McGuinness | E06B 9/01 | 49/56 |
| 2,292,954 | A | * | 8/1942 | Martin | E06B 9/01 | 102/274 |
| 2,681,481 | A | * | 6/1954 | Mason | E06B 3/685 | 49/56 |
| 2,722,722 | A | * | 11/1955 | Mussman | E06B 9/01 | 49/57 |
| 2,772,452 | A | * | 12/1956 | Modes | E06B 9/01 | 49/54 |
| 3,224,048 | A | * | 12/1965 | Sullivan | E06B 9/01 | 52/645 |
| 4,817,334 | A | * | 4/1989 | Badger | E06B 9/01 | 49/55 |
| 5,018,302 | A | * | 5/1991 | Kluge | E06B 9/04 | 49/55 |
| 5,269,096 | A | * | 12/1993 | Hade | E06B 9/04 | 49/61 |
| 5,579,604 | A | * | 12/1996 | Holung | E06B 9/02 | 52/202 |
| 5,603,183 | A | * | 2/1997 | Giovinazzi | E06B 9/02 | 49/55 |
| 5,740,628 | A | * | 4/1998 | Almond | E06C 9/10 | 49/141 |
| 5,893,235 | A | * | 4/1999 | Almond | E05C 19/003 | 49/63 |
| 5,910,076 | A | * | 6/1999 | Gladney | E06B 9/04 | 49/55 |
| 5,979,137 | A | * | 11/1999 | Shoup | E06B 9/04 | 49/501 |

(Continued)

*Primary Examiner* — Justin B Rephann
(74) *Attorney, Agent, or Firm* — Sanchelima & Associates, P.A.; Jesus Sanchelima; Christian Sanchelima

(57) ABSTRACT

The present invention refers to a protection device for windows, doors or open spaces with release arrangement (1) which maintains a mechanism that allows the generation of an opening in windows, doors or open spaces that have protections where these can be displaced in a situation that so requires allowing the generation of an additional output that in case it is not required provides a window of normal appearance.

9 Claims, 5 Drawing Sheets

(56) References Cited

U.S. PATENT DOCUMENTS

| | | | | |
|---|---|---|---|---|
| 6,481,158 | B1 * | 11/2002 | Marks | E05B 63/246 49/141 |
| 8,176,678 | B2 * | 5/2012 | Dochtermann, III | E06B 9/01 49/55 |
| 8,443,550 | B1 * | 5/2013 | Burns | E06B 9/04 49/55 |
| 10,077,602 | B2 * | 9/2018 | Rowley | E06B 9/02 |
| 2005/0081446 | A1 * | 4/2005 | Muller | E04G 21/3204 49/57 |
| 2005/0193651 | A1 * | 9/2005 | Kirk | E06B 9/04 52/202 |
| 2011/0225887 | A1 * | 9/2011 | Manier | E06B 9/52 49/56 |

* cited by examiner

ADJUSTABLE WINDOW BARS WITH EASY RELEASE

TECHNICAL FIELD

The present invention pertains to the field of mechanics and security, specifically to structural arrangements which are incorporated in places of a window of a house or building, more specifically to security elements with some sort of releasing configuration and still more specifically, the present invention refers to a protection device for windows, doors or open spaces with releasing arrangement.

BACKGROUND

It is known that a window guard consists of bars or grids usually made of metal that are adjustable to fit windows, doors or open spaces of any size and are secured in place with some type of bonding means such as welding and even screws or wall anchors and these guards can be custom fabricated or sold prefabricated.

Additionally, it is known that some window, door or open space protectors are made to retract or fold away when not in use. Window, door or open space guards are designed to protect users in general from falling, while offering some degree of security or privacy, so the relevance of having a window guard could be defined in addition to these points, as a means with the objective of preventing injuries and deaths caused by falls from windows, doors or open spaces of tall buildings, houses and other structures.

Window, door or open space guards can be especially important for young children, as they can be easily opened or pushed open when a guard is not in place. They can be used on windows, doors or open spaces on all levels of a home or building, providing an additional layer of protection against potentially dangerous falls while also providing a greater sense of security, as well as additional insulation that can help reduce heating and cooling costs.

In addition, it is known that a window, door or open space protection system usually consists of a fixed structure with bars or a metal screen that may even be interlocked and that provides a resistant structure and offers excellent security against unwanted entry.

However, some types of windows, doors or open spaces are designed to function as emergency exits, for example, in case of fire a window can be a life-saving portal, however, this is complicated in case the protection is completely fixed and there is no configuration that allows its removal. On the contrary, in case there is such a structure, movable or with some kind of movable arrangement, it must be reliable enough not to allow easy manipulation for removal as it presents the risk that for example a small child could fall through the escape opening. Therefore, in the state of the art there is a need for a window protection system that is safe to prevent falls, while at the same time being easily removable if necessary to use an escape opening in case of emergencies or unfavorable situations such as a fire.

In this sense, the protection systems for windows, doors or open spaces known in the state of the art are those whose design generally consists of a fixed bar in order to cover an opening and prevent the fall of the user, however, these do not have the particularity of being able to be actuated by the user in order to be easily removed since most of them require a series of steps and special training for its proper operation, which in an emergency situation is complex to apply and could result in a greater risk due to the impossibility of removing the protections.

OBJECT OF THE INVENTION

The present invention provides an enclosure device for protection in windows, doors or open spaces, doors or open spaces with release arrangement (1) for facilitating the release of the guards from a window by means of a guard release mechanism which is included in the same arrangement of the window frame and the guards.

The present invention also facilitates the process of releasing the protections of a window, making it possible for each user to eventually provide such release in case of emergency, for example, a serious fire in a building, an earthquake that weakens the building structure, an accident that prevents the use of building stairs, explosive or toxic gas leakage in the building, evacuations due to third party threats, among others where by means of its configuration, the present invention allows users to have a window protection that is removable.

The present invention provides opportunities for release of window, door or open space protectors to a wide variety of places and situations such as residential buildings, hotels, hospitals, offices, schools, shopping centers, banks, public administrations, churches, restaurants, among others.

To achieve the above, users can even install the invention in existing windows, doors or open spaces by making minimal arrangements in terms of civil work without causing potential damage to the building structure.

An additional object of the invention is to provide a protection device for windows, doors or open spaces, doors or open spaces with release arrangement (1) that is simple to operate by any user.

An additional object of the invention is to provide a protection device for windows, doors or open spaces, doors or open spaces with release arrangement (1) having safety bars with a telescopic or adjustable configuration.

An additional object of the invention is to provide a protection device for windows, doors or open spaces, doors or open spaces, doors or open spaces, doors or open spaces with release arrangement (1) having a mechanism not prone to failure as to the components comprising it.

An additional object of the invention is to provide a protection device for windows, doors or open spaces, doors or open spaces with release arrangement (1) having an easily accessible mechanism for maintenance work.

An additional object of the invention is to provide a protection device for windows, doors or open spaces, doors or open spaces with release arrangement (1) which is non-invasive as to the overall structure of a window.

An additional object of the invention is to provide a protection device for windows, doors or open spaces, doors or open spaces with release arrangement (1) that does not interfere with the view that a window provides.

Therefore, any or all of the following advantages can be provided by the present invention: decrease the risks incurred by not having a window with guards, decrease the risks incurred by not having a window that allows the guards to be released, the increase in emergency exits; decrease the number of users who will exit through a specific emergency exit by having more emergency exits; increase efficiency and reduce times in an evacuation procedure; providing another method and strategy for evacuation in an emergency situation; improving the view of windows, doors or open spaces by not having elements that cover them completely; improving safety in general; ensuring a correct distribution of users in an emergency situation for redirection to safe places; the possibility of better planning an evacuation, shorter lines for an evacuation, among others.

The most important features of the invention have therefore been outlined, rather broadly, so that the detailed description of the invention which follows may be better understood, and so that the present contribution to the art may be better appreciated. There are, of course, additional features of the invention which will be described below and which will form the subject matter of the appended claims.

In this regard, before explaining in detail at least one embodiment of the invention it should be understood that the invention is not limited in its application to the construction details and component arrangements set forth in the following description or illustrated in the drawings The invention is susceptible of other embodiments and of being put into practice and carried out in various ways. Further, it should be understood that the phraseology and terminology employed herein are for purposes of description and are not to be considered limiting.

As such, those skilled in the art will appreciate that the conception on which this description is based can readily be used as a basis for the design of other structures, methods and systems for carrying out the various purposes of the present invention. It is important, therefore, that the claims be considered as in including such equivalent constructions insofar as they do not depart from the spirit and scope of the present invention.

Further, the purpose of the subject matter of the invention is to enable a patent examiner, the general public, and especially security personnel and those skilled in the art who are unfamiliar with legal or patent terms or phraseology, to quickly determine from a cursory inspection the nature and essence of the technical disclosure of the application. This introduction is not intended to define the invention of the application, which is measured by the claims, nor is it intended to limit the scope of the invention in any way.

These together with other objects of the invention, together with the various features of novelty characterizing the invention, are pointed out with particularity in the appended claims and which form part of the present disclosure. For a better understanding of the invention, its operating advantages and the specific objects achieved by its uses, reference should be made to the attached drawings and descriptive material in which preferred embodiments of the invention are illustrated.

Other objects of the present invention will become apparent to those skilled in the art, in particular upon consideration of the following detailed description of preferred embodiments.

DESCRIPTION OF THE INVENTION

Figure 1:
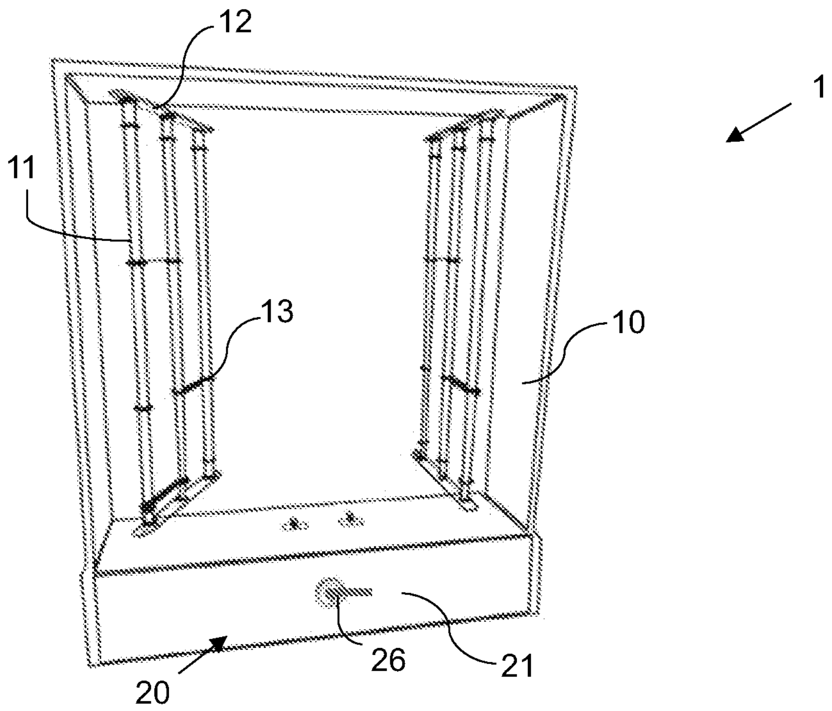
FIG. 1. Shows an isometric view of the protection device for windows, doors or open spaces with release arrangement (1).
Figure 2:
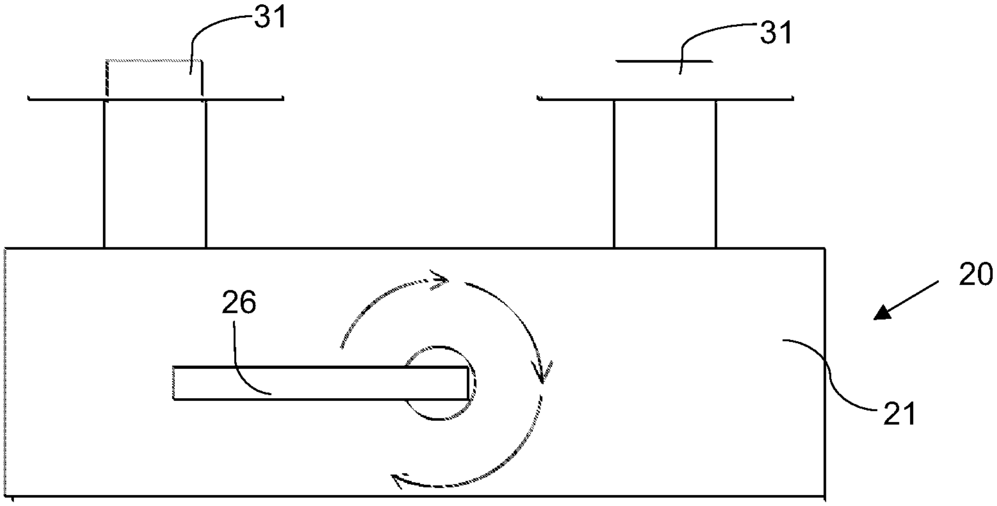
FIG. 2 shows a front view of the release arrangement (20) of the window, door or open space protection device with release arrangement (1).
Figure 3:
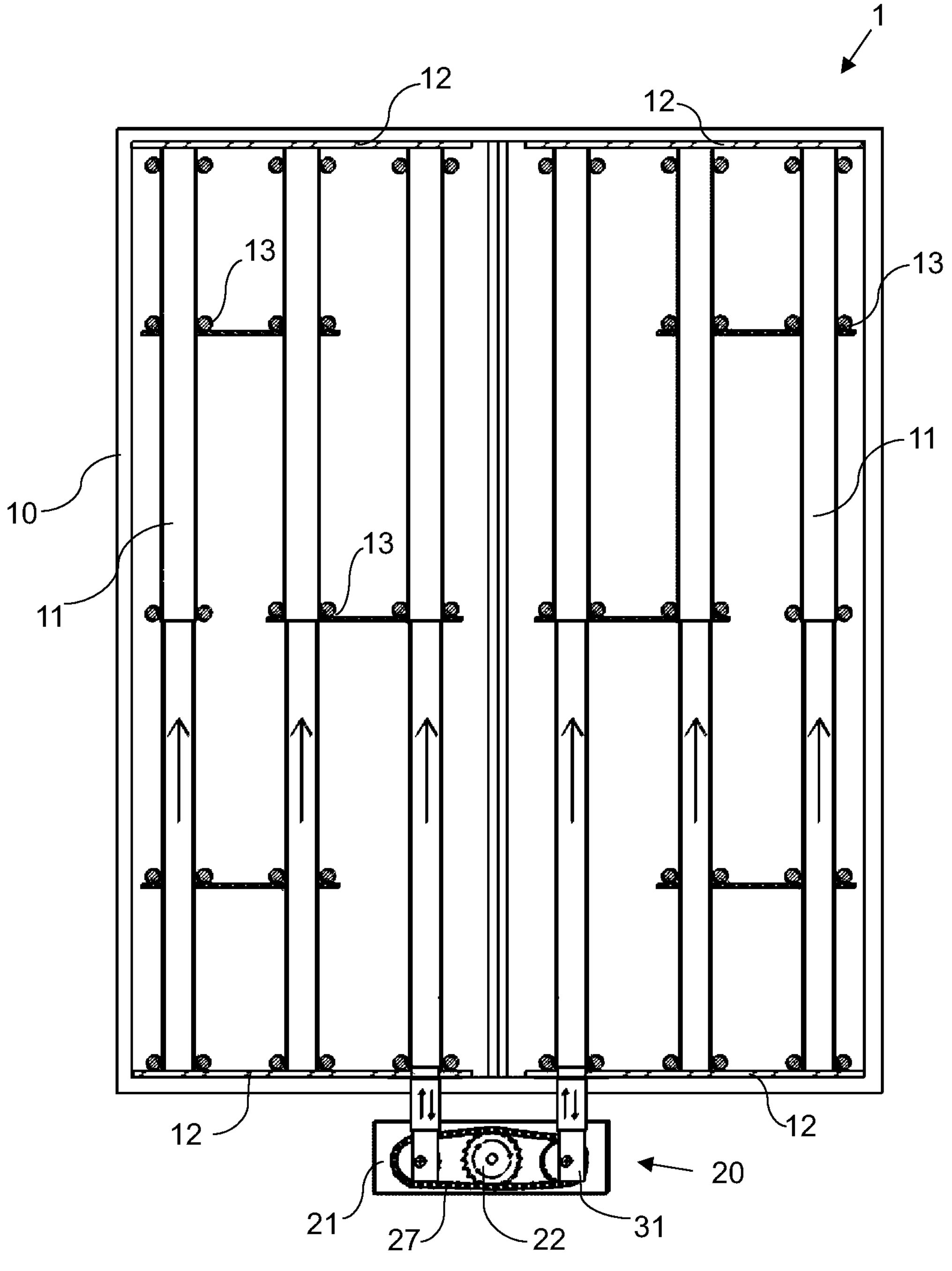
FIG. 3. Shows a rear view of the protection device for windows, doors or open spaces with release arrangement (1).
Figure 4:
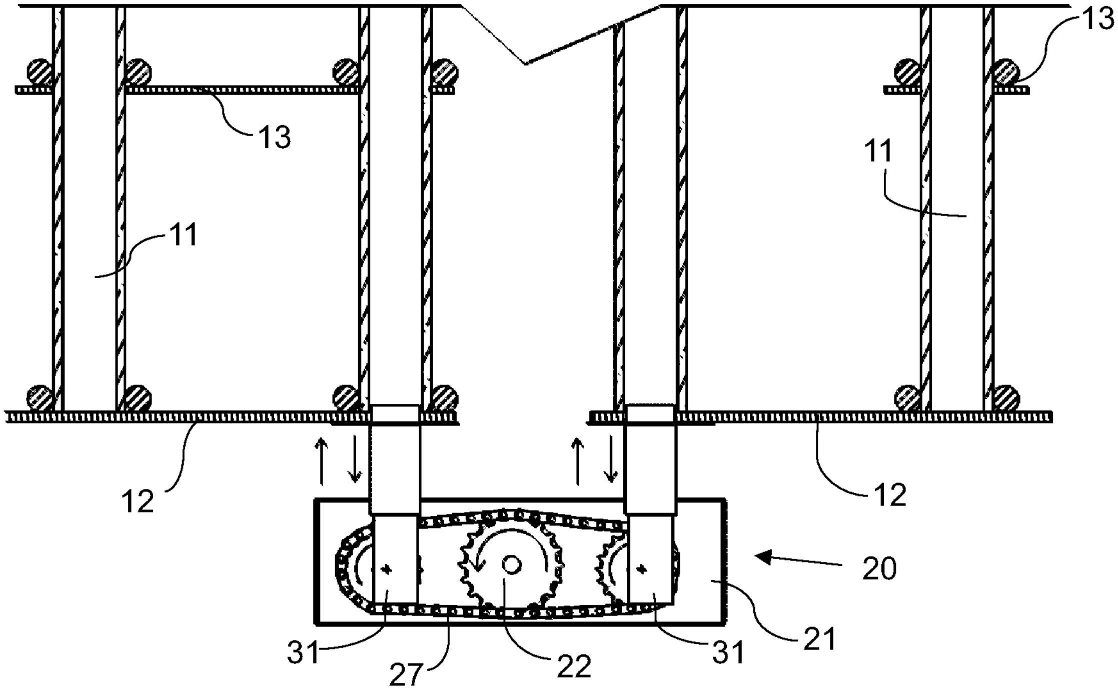
FIG. 4. Shows a rear view of the lower part of the window, door or open space protection device with release arrangement (1).
Figure 5:
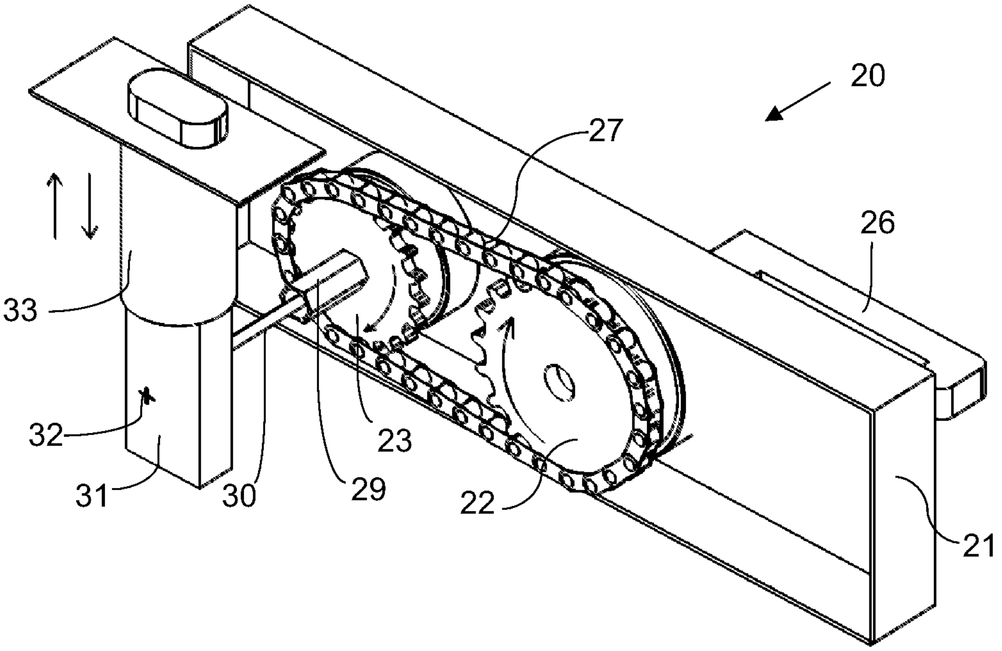
FIG. 5. Shows an isometric view of the release arrangement (20) of the window, door or open space protection device with release arrangement (1).
Figure 6:
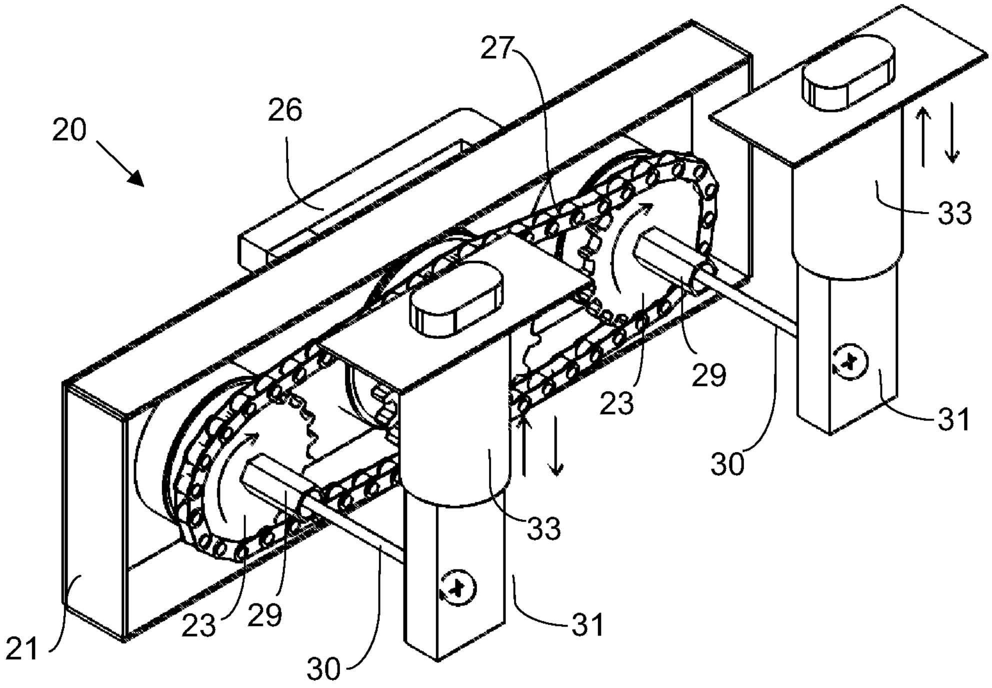
FIG. 6. Shows an isometric view of the release arrangement (20) of the window, door or open space protection device with release arrangement (1).
Figure 7:
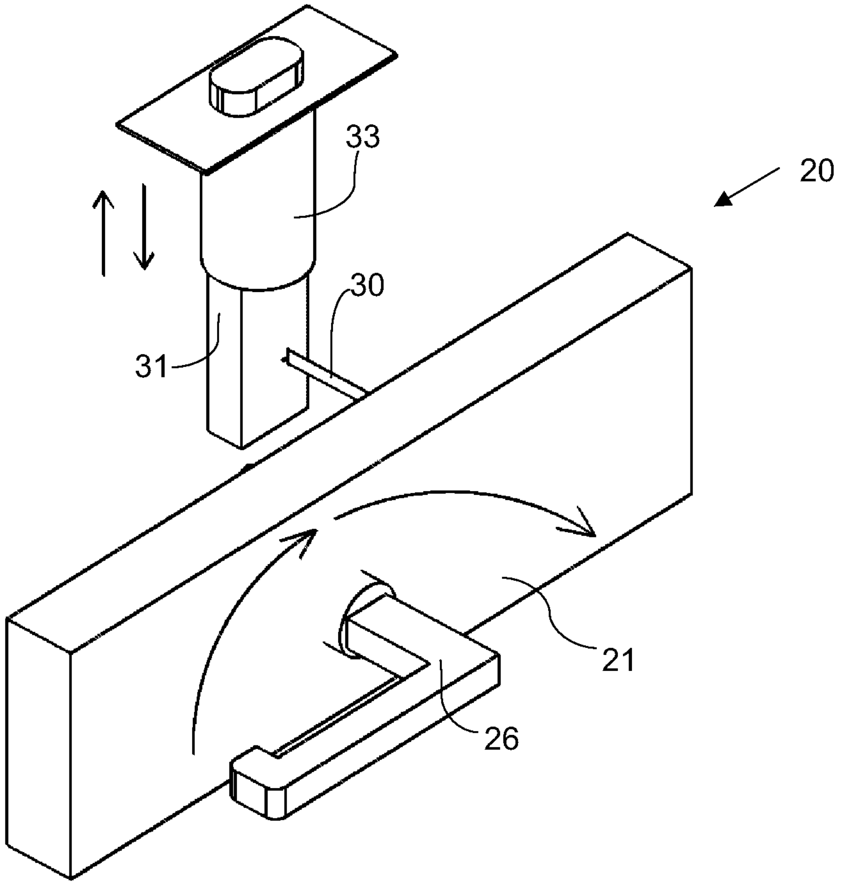
FIG. 7. Shows an isometric view of the release arrangement (20) of the window, door or open space protection device with release arrangement (1).
Figure 8:
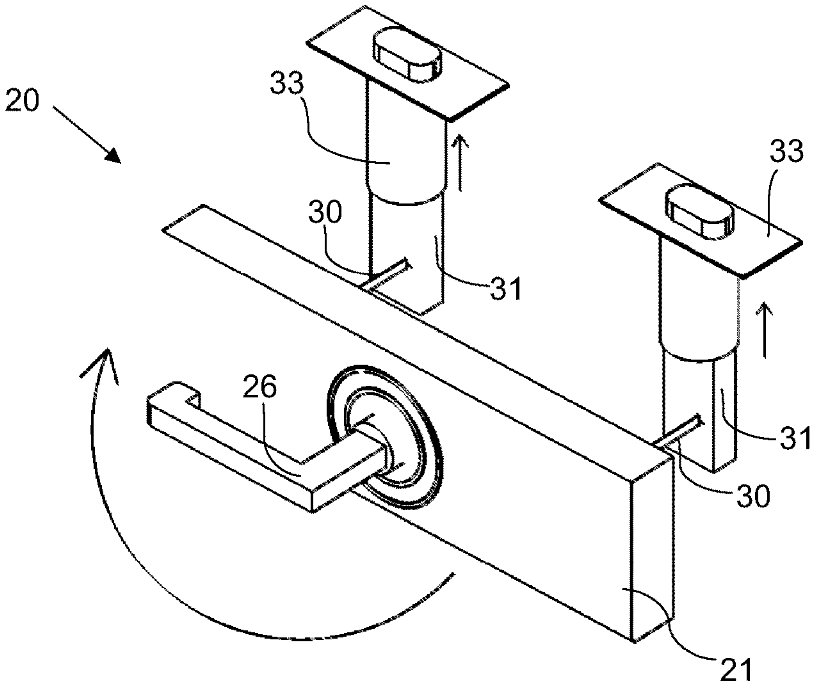
FIG. 8. Shows an isometric view of the release arrangement (20) of the window, door or open space protection device with release arrangement (1).
Figure 9:
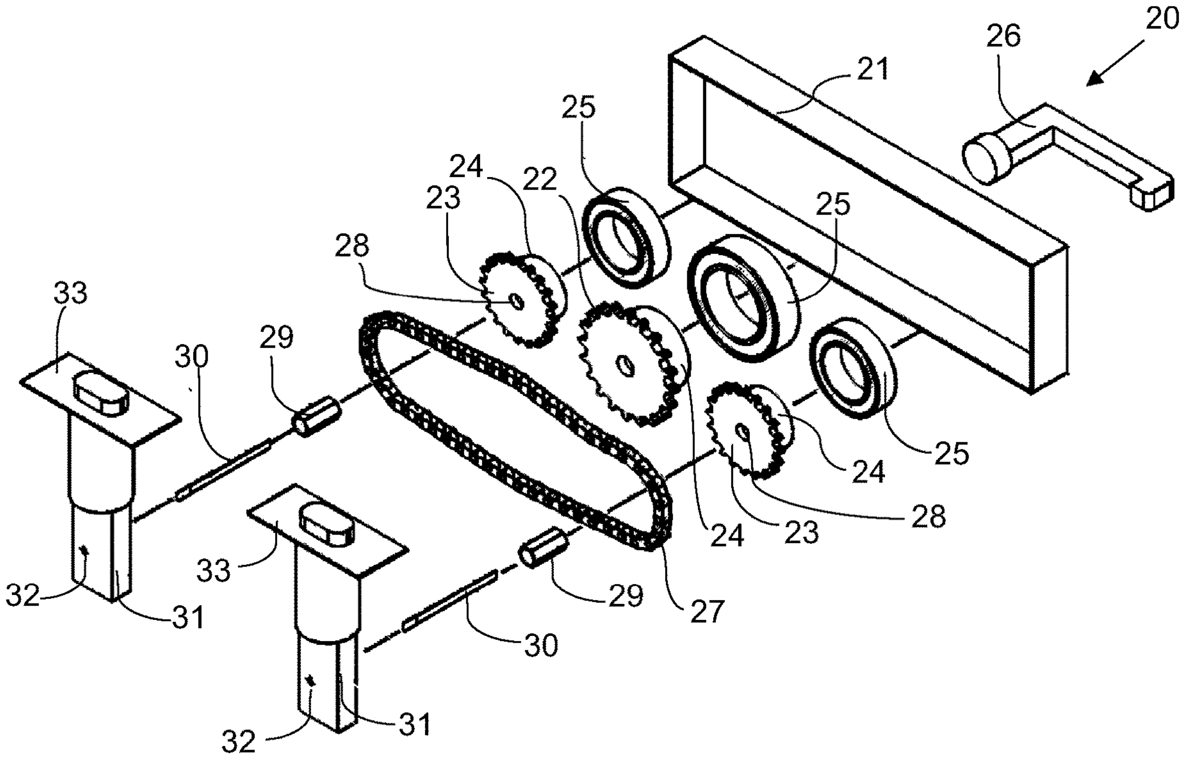
FIG. 9. Shows an exploded isometric view of the release arrangement (20) of the window, door or open space protection device with release arrangement (1).

Reference will now be made in detail to presently preferred embodiments of the invention, which refers to a protection device for windows, doors or open spaces with release arrangement (1) wherein said embodiments are provided by way of explanation of the invention, which is not intended to be limited thereto. Indeed, those skilled in the art will appreciate upon reading the present description and viewing the accompanying drawings that various modifications and variations are possible.

For example, features illustrated or described as part of one embodiment may be used in other embodiments to produce an additional embodiment. In addition, certain features may be interchanged with similar structural elements or features not yet mentioned that perform the same or similar functions. Therefore, it is intended that such modifications and variations are included within the entirety of the present invention.

In accordance with the principles of the present invention, it is considered that users have the ability to determine the point zones of a window in a house or building, so that the allusion to the frame, guard, screen, glass or plastic portions of a window as well as the determination of the need to release the window guards during an emergency situation should not be problematic.

The present invention, which refers a protection device for windows, doors or open spaces with release arrangement (1) which maintains a window frame portion (10) with protections or protection bars (11, 11*a*) and a release mechanism portion (20) which together provide the user with the possibility of having a protection element for a window which can also be removed in case it is required by said user, for example, in an emergency situation.

Initially there is provided a window frame (10) designed to support a window, so that an additional frame arrangement and even protections may include a transparent body inserted in the inner portion of the frame to provide the window with impenetrable thermal and acoustic insulation so that the window frame (10) consists of an outer frame structure made of a metallic material such as iron or steel and even alternative materials such as wood, polymeric materials such as PVC or a combination of various materials wherein this outer frame (10) is the containment structure supporting the window, the outer frame profiles (10) have the function of covering the edges of the window wherein these profiles are made of a metallic material such as aluminum or steel to increase durability. The window frame (10) may have a specific reinforcement generally with double load bearing elements on each of its sides or may even have some type of treatment or coating to resist the incidence of water, corrosion, dust, pollutants and additional elements of contamination such as the effects of insects. In a further aspect of the window frame (10), the window frame (10) has angles on the edges of the window and may even have wedges to provide additional strength to the frame.

Still in a further aspect, the outer frame (10) of the window may be lined with a gasket or gasket to make special seals to increase air tightness and deflect air to keep out moisture. This gasket or gasket may be replaced by portions of adhesive tape wherein it provides adhesion and strength.

If necessary, a protective screen can be added to prevent the entry of insects, bugs or large objects. This is accomplished through the use of a weather resistant fabric.

In a further aspect of the outer frame (10) this includes an arrangement of a series of containment bars (11) and a series of release bars (11*a*) wherein these are maintained in a vertical configuration to prevent the passage of objects or the passage of persons in events that could compromise their safety such that said containment bars (11) and release bars (11*a*) are positioned at a certain distance with respect to other protection bars (11, 11*a*) may be arranged equidistant or varied, wherein the restraining bars maintain a solid arrangement in their structure while the release bars have a hollowed out configuration in their internal part, since such hollowing out is necessary for the insertion and exit of locking or release means during activities where it is required to generate an exit space by means of the removal of the bars, so that the release bars (11*a*) are arranged in the central part of the arrangement of guard bars (11, 11*a*) and said group of bars is contained in a bar collector (12) which is arranged at each of the ends of the guard bars (11, 11*a*) preferably at the upper and lower portions of each of the guard bars (11, 11*a*) and wherein this bar collector (12) is pivotally connected at one point with the outer frame (10) by means of a pivot bar which is inserted in a bore in the outer frame, said pivoting being arranged at one of the ends of the bar collector (12) preferably at the end closest to one of the sides of the outer frame (10). In an alternative embodiment of the protection bars (11, 11*a*) these arrange ornamental arrangements (13) by way of connection between said bars (11, 11*a*).

In general the bars (11, 11*a*) may include some type of coating, wherein these consist of the application of protective anti-corrosion coatings wherein a series of layers may be applied physically, by arc, electro-chemically, heat or a combination of the above. Metallic coatings usually consist of a combination of zinc and aluminum chromate, while anti-corrosion coatings are composed of different chemicals to prevent corrosion and these coatings protect the metal surface against weathering, moisture and environmental corrosive agents, additionally coatings can also be applied as a primary layer to increase the protection of the material, or as an additional layer to improve the appearance and durability of the metal. Once the coating is applied, its adhesion and coating thickness can be verified as required for the application at the bars (11, 11*a*) and the bar collector (12). A traditional coating can be the application of paint, as well as protection with some type of plastic coating.

In the lower part of the outer frame (10) there is a release arrangement (20) which maintains a configuration that allows to release some pins that are coincident with the emptying that present the release bars (11*a*) and keep them in their position so that these can arrange an opening by means of the rotation of the set of bars (11, 11*a*) with the bar collector (12) (previous release of the release bars) with the outer frame. The release arrangement (20) is composed of a housing (21) having a recess in its internal part defining a cavity in which is inserted a gear train composed of a central gear (22) and two side gears (23) aligned in series and connected on diametrically opposite sides of the central gear (22) and wherein each of the gears of the gear train (23) is connected to the central gear (22). one of the gears of the gear train has a connecting extension (24) which maintains an extrusion oriented in the direction of the housing (21) and wherein this extension is coupled with a bearing means (25) which in turn is coupled with the wall of the housing (21) and wherein said bearing means is preferably a bearing. Additionally, the central gear (22) maintains a direct connection with a lever (26) having a connecting extension whose axis is coincident with the central axis of the central gear (22) and passes through a bore passed in the housing (21). The lever (26) maintains a portion perpendicular to the axis of connection with the central gear (22) that allows the application of a torsional torque for the transmission of movement towards the gear train.

On the other hand each of the gears is coupled with a peripheral means of motion transmission (27) comprising a series of mechanical components linked together to transfer the motion from the central gear (22) to the side gears (23) preferably said means of transmission is a chain whose components are connected to each other and in turn to the periphery of the gears (22, 23) and are used to transmit mechanical energy from the lever (26) to the side gears (23). The peripheral means of motion transmission (27) may in addition to being a chain, be a belt and be made of metal, plastic or even rubber and functions as an auxiliary element of transmission of the motion applied with the rotation of the lever (26).

Each of the lateral gears (23) has a central bore (28) in which is coupled a connecting means (29) whose section is coincident with the diameter of the central bore (28) and which in turn is connected to a lifting rod (30) which maintains a centered configuration with respect to the connecting means (29) and which at the opposite end of said connection has a flat end which is inserted in a lower portion of a safety pin (31) which maintains a cross-shaped groove (32). The safety pin (31) is arranged perpendicular to the lifting rod (30). Additionally, the safety pin (31) has a protective cover (33) which is inserted in the outer frame (10) and which defines the path of the safety pin during its ascent and descent determined by the rotation of the lifting rod (30) and wherein the protective cover defines an opening in its upper part which is coincident with the emptying of the release bars (11*a*) so that the safety pin can be inserted or removed for the opening or locking of the window bars.

In an alternative embodiment of the invention it is had that the guard bars (11, 11*a*) of adjustable security for doors, windows are capable of telescopically extending to fit any size of door or window while retaining the feature of preventing access into the door or window or open space wherein guard bars (11, 11*a*) are adjustable and wherein said adjustment is by means of a telescopic extension provided by means of a post comprising a first part and a second part wherein the first part is telescopically arranged within the second part and wherein the second part has a diameter with inner dimension, so that the second part can telescopically receive the first part, which has a smaller diameter or outer dimension.

Other embodiments of the above alternative embodiment may even provide for protection bars (11, 11*a*) comprising more than two parts.

Additionally, the protection bars (11, 11*a*) are tubular posts. However, various shapes may be arranged, for example, square, round, oval, triangular, rectangular, hexagonal, or other various shapes and wherein preferably, but not necessarily, the shape of the first part should correspond to that of the second part. However, in other embodiments, the shape of the first part and the second part do not correspond; for example, a circular shaped first part is coupled with a square second part in a telescoping manner.

Further, the safety guard bars (11, 11*a*) may be formed from a variety of materials suitable for this purpose such as any material, or combination of materials, with suitable strength, such as, but not limited to, iron, steel, aluminum, metal alloy, other metal-based materials, fire-resistant materials, as well as plastic materials that absorb shock well, such as, for example, polycarbonate, hard plastics, composite materials, etc.

Portions of each of the guard bars (11, 11*a*) are axially aligned and overlap each other so that they can be telescopically extended to span an infinite variety of existing or newly constructed window or door frame sizes.

The telescoping guard bars (11, 11*a*) may also include a plurality of crossbars crossing the posts or bars to provide additional strength and rigidity to these guard bars (11, 11*a*) and to aid in maintenance.

The above-described embodiment of the adjustable safety guard bars (11, 11*a*) has the advantage that it can be installed inside or outside the door or window. In addition, a plurality of adjustable security bars can be easily combined to include a wide range of door and window sizes. The telescopic vertical adjustability of the adjustable security bars has the advantage of allowing easy application and adjustability to any size window or door frame. In addition, the modules can also be installed in a horizontal position to provide increased flexibility and application to an even wider range of door and window frame sizes.

In this way, the proposed invention can be applied for protections on windows, doors and enclosed spaces adjustable to any window size, by means of the arrangement described above.

Still in another embodiment of the present invention, this refers to a safety device used for releasing window, door or open space guards comprising at least one bolt movable between an engaged position and an disengaged position wherein this or these bolts are arranged to be coupled to the outer frame (10) and to be actuated directly from the engaged position. It has in turn, locking means to prevent the movement of at least one of the bolts from the coupled position to the uncoupled position and contains operating elements for maneuvering the safety device from the end of the device, which may be a knob, lever, key or electrical sensor, and which allow the bolts to move between the coupled and uncoupled positions. These pins are aligned and held in place by a spring and a linkage element which, when released, allows the pins to move and release. The safety device also contains a control device which has a power plug, an RF receiver, an audible alarm and a rechargeable battery in the event of a power failure. The control device is activated by a smoke detector which sends a signal to the RF transmitter, and the receiver activates the solenoid to release the bolts.

It should be noted that the above structures and methods are not limited to window, door or vertical open space guards. In other embodiments, the features described herein can also be practiced in a horizontal window arrangement where the release device moves horizontally with respect to the bar collector to open the structure.

Although various embodiments of the window, door or open space protection device with release arrangement (1) have been described above, it is to be understood that they have been presented by way of example only and not as a limitation. Where the structural elements described above indicate certain selected shapes or certain mode of coupling or assembly occurring in a certain order, the order of certain events may be modified. Further, some of the structural elements may be replaced by similar elements involving the same effect, for example the use of a band instead of a chain for transmission effects or the use of a knob instead of a lever for motion transmission purposes where possible, as well as may be performed sequentially as described above and although various embodiments having particular features and/or combinations of components have been described, other embodiments having a combination of any feature and/or component of any of the embodiments are possible where appropriate. For example, in some embodiments, a release mechanism may include more than one pair of release pins that may be selectively positioned in fluid communication with the release arrangement whereby the above embodiments should only be construed as examples of the various types of connectors, bars, frames, transmission means that may be used in connection with the implemented apparatus for the release of window, door or open space guards.

The many features and advantages of the invention are evident from the detailed specification and, therefore, the appended claims are intended to cover all features and advantages of the invention which fall within the true spirit and scope of the invention. Moreover, since numerous modifications and variations will readily occur to those skilled in the art, it is not desired to limit the invention to the exact construction and operation illustrated and described and, accordingly, recourse may be had to all suitable modifications and equivalents, which are within the scope of the invention.

What is claimed is:

1. A window, door or open space protection device with a release arrangement, comprising:

a window frame portion, wherein said window frame portion includes containment bars, release bars, and collector bars, wherein said containment bars and said release bars are placed within said window frame portion, wherein each of said containment bars receive one of said release bars in a telescopic configuration defining a plurality of telescopic guard bars, wherein a first set of telescopic guard bars of said plurality of telescopic guard bars are enclosed between a first set of collector bars defining a first frame structure, wherein a second set of telescopic guard bars of said plurality of telescopic guard bars are enclosed between a second set of collector bars defining a second frame structure; and a release arrangement, wherein said release arrangement includes a housing, a gear train, a lever, and a plurality of safety pins, wherein said first frame structure is pivotally attached to said housing from a bottom lateral end of said first frame structure, wherein said second frame structure is pivotally attached to said housing from a bottom lateral end of said second frame structure, wherein said gear train includes a central gear and side gears, said central gear is operatively connected to said lever, said central gear is positioned between said side gears, said central gear is rotatably attached to said side gears by means of a motion transmission, wherein each of said side gears are operatively connected to a safety pin of said plurality of safety pins, said plurality of safety pins are configured to protrude up and down from said housing to insert into a bottom open end of at least one of said telescopic guard bars to fix said first frame structure and said second structure in a closed configuration, said lever is rotated forcing said central gear to rotate, said side gears rotate as said central gear rotates, said side gears are rotatably connected to said safety pins, when said side gears rotate force said plurality of safety pins to move up and down from said housing.

2. The window, door or open space protection device with a release arrangement set forth in claim 1, wherein said window frame portion includes an external frame, said external frame has a left wall, a right wall and a top wall, said left wall and said right wall extend perpendicularly from a left end and a right end of said housing, respectively.

3. The window, door or open space protection device with a release arrangement set forth in claim 2, wherein said first frame structure is pivotally attached to said top wall from a top lateral end thereof, wherein said second frame structure is pivotally attached to said top wall from a top lateral end thereof.

4. The window, door or open space protection device with a release arrangement set forth in claim 1, wherein said window frame portion has a coating layer.

5. The window, door or open space protection device with release arrangement set forth in claim 4, wherein said plurality of telescopic guard bars have an anti-corrosive coating.

6. The window, door or open space protection device with release arrangement set forth in claim 1, wherein said plurality of telescopic guard bars are placed in a vertical configuration, said plurality of telescopic guard bars are equidistantly spaced and parallel therebetween, said plurality of telescopic guards are perpendicular to a top end of said housing.

7. The window, door or open space protection device with release arrangement set forth in claim 1, wherein said motion transmission is made of metal.

8. The window, door or open space protection device with release arrangement set forth in claim 1, wherein said housing includes protective coverings, said protective coverings partially protrude from a top end of said housing, said protective coverings are hollow, wherein each of said plurality of safety pins slide through one of said protective coverings and protrude outwardly from said protective coverings in said closed configuration.

9. A window device with a release arrangement, consisting of:

a window frame portion, wherein said window frame portion includes containment bars, release bars, an external frame, and collector bars, wherein said containment bars and said release bars are placed within said external frame, wherein each of said containment bars receive one of said release bars in a telescopic configuration defining a plurality of telescopic guard bars, wherein a first set of telescopic guard bars of said plurality of telescopic guard bars are enclosed between a first set of collector bars defining a first frame structure, wherein a second set of telescopic guard bars of said telescopic guard bars are enclosed between a second set of collector bars defining a second frame structure, wherein said external frame has a left wall, a right wall and a top wall, wherein said first frame structure is pivotally attached to said top wall from a top lateral end thereof, wherein said second frame structure is pivotally attached to said top wall from a top lateral end thereof, wherein said telescopic guard bars are placed in a vertical configuration, said plurality of telescopic guard bars are equidistantly spaced and parallel therebetween, wherein said telescopic guard bars have an anti-corrosive coating; and a release arrangement, wherein said release arrangement includes a housing, a gear train, a lever, and a plurality of safety pins, wherein said left wall and said right wall of said external frame extend perpendicularly from a left end and a right end of said housing, respectively, wherein said first frame structure is pivotally attached to said housing from a bottom lateral end of said first frame structure, wherein said second frame structure is pivotally attached to said housing from a bottom lateral end of said second frame structure, wherein said telescopic guards are perpendicular to a top end of said housing, wherein said gear train includes a central gear and side gears, said central gear is operatively connected to said lever, said central gear is positioned between said side gears, said central gear is rotatably attached to said side gears by means of a motion transmission, said side gears are two side gears, wherein each of said side gears are operatively connected to a safety pin of said plurality of safety pins, said plurality of safety pins are two safety pins configured to protrude up and down from said housing to insert into a bottom open end of two of said telescopic guard bars to fix said first frame structure and said second structure in a closed configuration, said lever is rotated forcing said central gear to rotate, said side gears rotate as said central gear rotates, said side gears are rotatably connected to said safety pins, when said side gears rotate force said safety pins to move up and down from said housing, wherein said motion transmission is made of metal, wherein said housing includes protective coverings, said protective coverings partially protrude from a top end of said housing, said protective coverings are hollow, wherein each of said safety pins slide through one of said protective coverings and protrude outwardly from said protective coverings in said closed configuration.

* * * * *